United States Patent Office 3,632,803
Patented Jan. 4, 1972

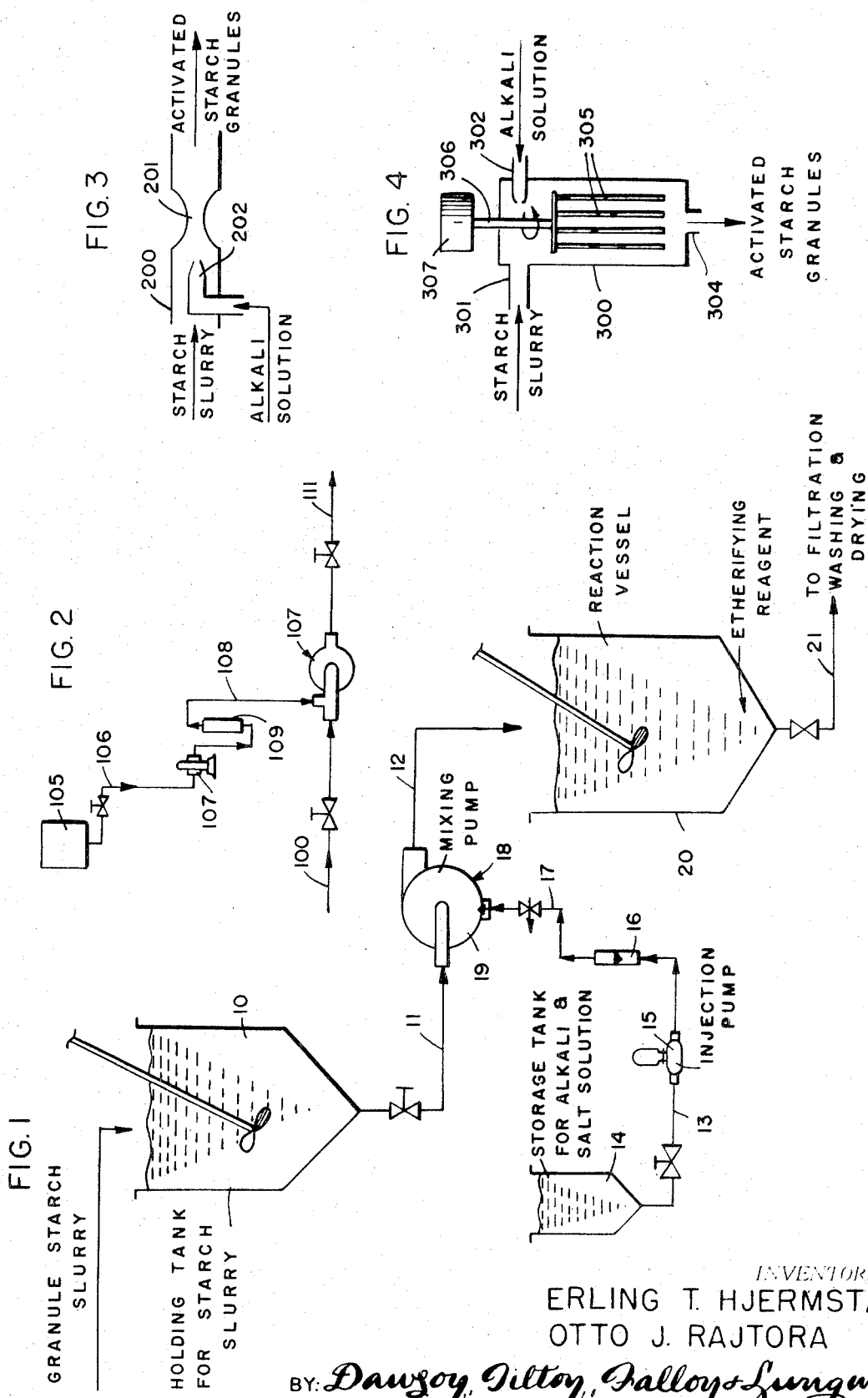

3,632,803
METHOD OF CONTROLLING THE ALKALI-CATALYZED ETHERIFICATION OF GRANULE STARCH
Erling T. Hjermstad, Cedar Rapids, and Otto J. Rajtora, Iowa City, Iowa, assignors to Penick & Ford Limited, Cedar Rapids, Iowa
Filed Nov. 12, 1968, Ser. No. 774,694
Int. Cl. C08b 19/06
U.S. Cl. 260—233.3 R
9 Claims

ABSTRACT OF THE DISCLOSURE

An improvement is provided in the method of manufacturing plant batches of starch ethers in a large reaction tank by reacting a water suspension of alkali-catalyzed granule starch with a monofunctional etherifying reagent while maintaining the filterability of the starch, the improvement comprising pumping a water suspension of granule starch through a pipeline including turbulent flow producing means, and injecting into the turbulently flowing suspension substantially uniformly proportioned amounts of a water solution of an alkali etherification catalyst to substantially instantaneously produce a uniform mixture of the alkali catalyst with the suspension. The resulting suspension of alkali-catalyzed starch granules is charged to the reaction tank for carrying out the etherification reaction. The method improves reaction uniformity resulting in better product filterability, reduction of solubles loss, and other advantages.

BACKGROUND

The etherification of granule starch with alkylene oxide is well known in the starch modification art, and has been practiced commercially by the starch industry in the United States for about 20 years. The basic process is described in Kesler and Hjermstad Pat. 2,516,633, which issued July 25, 1950, and is now expired. Over the period from 1950 to the present, the process of this patent was practiced by the patent owner, Penick & Ford, Ltd., and by a number of other starch companies in the United States, who were licensed under the patent.

Basically, the Kesler and Hjermstad process provided a means for significantly modifying the properties of starch by etherification of starch with ethylene oxide or other alkylene oxide while at the same time maintaining the filterability of the starch. This was accomplished by incorporating an alkali catalyst, such as sodium hydroxide, in the water suspension in an amount sufficient to promote the etherification reaction without at the same time swelling the starch to a non-filterable condition at the temperature of the reaction. A further feature of the process involves the inclusion of a water-soluble salt of an alkali metal or an alkaline earth metal to inhibit the swelling of the starch. In commercial practice the most widely used salt swelling inhibitors have been sodium chloride and sodium sulfate.

By etherifying the starch granules while maintaining them in a relatively non-swollen state, the etherified product can be dewatered by filtration or centrifugation, and can be further purified by washing, after neutralization of the alkali to salts. The washing is usually conducted by resuspending the filtered starch, and then again dewatering by centrifugation or filtration, to remove additional salts. The product is then subjected to final drying to produce the modified starch in free-flowing granule form, which can then be formed into a paste, as required for use in the paper or textile industries.

The problem

Since the etherification of starch with alkylene oxides, or other monofunctional etherifying reagents, such as the alkyl halides, is a process requiring considerable reaction time, and involves the addition of an etherifying agent, it is common practice in the starch industry for the reaction to be carried out in large batch-type reaction vessels. These large reaction vessels are equipped with stirring devices to maintain the starch in uniform suspension, and include means, such as a sparger, for the introduction of the etherifying reagent. In the existing commercial practice, the reactor is charged with a water suspension of the granule starch to be reacted. The next step is the addition of the alkali catalyst, which is usually accompanied by the salt inhibitor, both being dissolved in water solution. Since it is well known that local over-concentrations of alkali can produce irreversible swelling of the starch granules (even in the presence of an inhibitor salt), the practice has been to add the alkali and salt solution gradually with continual stirring until the required amount of catalyst has been distributed throughout the suspension.

Customarily, the alkali solution or alkali-salt solution is added to the surface of the starch slurry in the agitated reaction vessel. To achieve minimum overall production time for each batch, it is desired to add the alkali at as rapid a rate as possible without causing any significant irreversible swelling of the starch granules. The practice has been to control the rate of alkali addition to avoid localized starch gelatinization, as evidenced by the development of so-called "fisheyes." These are sticky lumps of gelatinized starch which are formed in the area immediately surrounding the contact point of the starch slurry and the incoming alkali stream if the rate of addition is too rapid. These lumps or fisheyes must be removed before the starch is dewatered and dried, since otherwise they will contaminate the starch with dried, horny particles which do not disperse readily in water even when the starch is gelatinized at elevated temperatures. Further, such alkali swollen starch represents a waste of starch if removed and is a deleterious contaminant if not removed. However, it has proven to be relatively easy to control the rate of alkali addition, particularly when the alkali is added in the presence of the inhibitor salt, to avoid the formation of any substantial amount of fisheyes.

Heretofore, it has been assumed that once the alkali catalyst is added and distributed throughout the starch slurry that the etherification reaction is ready to proceed. By controlling reaction temperature and degree of etherification, the etherified product can be produced in a filterable, washable form. At times, some difficulties in filtration are encountered, especially during washing where the content of inhibitor salt is reduced to a low level. Also, it has been recognized that a substantial percentage of the starch is converted to a soluble form during the reaction, and that this solubilized starch passes through the filter or centrifuge with the dissolved salts, and is lost with the waste water from the initial filtration and subsequent washing steps.

Since starch contains some degraded or depolymerized material and because of the nature of the etherification reaction, it has heretofore been assumed that the loss of starch solubles, although undesirable from the economic standpoint, was an inherent part of the process. The loss of starch solubles can range up to 25%, or even higher of the starch starting material. The problem is particularly acute where the etherified starch is thinned or depolymerized with acids or oxidizing agents. For reasons which are not pertinent here, it has been the industry practice to produce acid-thinned, etherified starch products by first etherifying the starch and subsequently thinning with acids. The resulting loss of starch material is frequently in the area of 12 to 14%, particularly for high fluidity types. Heretofore, no means have been known for controlling the etherification reaction to significantly reduce the loss of starch solubles.

SUMMARY OF INVENTION

This invention is based in part on the discovery that the etherification of granule starch with reagents such as alkylene oxides can be greatly improved by a new technique of adding the alkali and/or alkali-salt solution. More specifically, the water suspension of the batch of granule starch to be reacted is formed into a turbulently flowing stream. Into this confined stream is continuously metered a proportioned amount of a water solution of the alkali etherification catalyst, which may include the inhibitor salt. This results in a novel pretreatment of the starch granules with alkali, thereby achieving much greater uniformity of alkali activation with respect to the individual starch granules. The water suspension of the precoated starch granules is then passed to the reaction vessel where it is reacted with the monofunctional starch etherifying reagent. As in prior practice, the reaction is carried out under non-swelling or non-gelatinizing conditions to maintain the filterability of the starch. Surprisingly, not only is filterability and washing improved, but the loss of solubles is appreciably reduced. At least from 10 to 25% or more of the solubles heretofore lost are maintained as insoluble granules, which provides more of the salable product, thereby achieving a very significant economic saving.

The theoretical explanation for the greatly improved results obtained by the process of the present invention are not fully understood. Apparently, however, the precoating of the granules with metered amounts of the alkali catalyst, results in a substantially more uniformly activated starch on a microscopic granule level, as distinguished from macroscopic alkali distribution in the starch slurry. Aliquots of the slurry after the addition of the alkali and salt in prior practice analyzed as showing substantially uniform alkali content. It was not recognized that the alkali activation with respect to the individual microscopic granules was nevertheless not uniform. This non-uniformity apparently causes some of the granules to etherify more readily than other granules, thereby resulting in a substantial proportion of the starch material being converted to a soluble form, while other starch granules were etherified to "incipient" gelatinization, thereby tending to interfere with the filtration and washing.

It will be appreciated that starch granules are really macro-molecules, being roughly spherical and having diameters (depending on the variety of starch) ranging from 2 to 150 microns. Prior to the present invention, it was assumed that uniform alkali activation was obtained by thorough mixing of the suspension so that the alkali concentration throughout measured substantially the same on an acid titration test. Consequently, the only control problem was to add the alkali or alkali-salt mixture at a slow enough rate to avoid the formation of the "fisheyes." As soon as the alkali was uniformly distributed throughout the suspension, it was assumed that the individual granules were equally activated and susceptible to etherification. However, the present invention demonstrates that this theory is not correct.

The present invention also sheds light on another problem of the prior practice. Despite efforts to maintain reaction conditions the same, in prior practice there were unpredictable variations in the degree of etherification and thereby in the resulting properties of the etherified starch. This made precise product control difficult. It was assumed that this variation was probably inevitable because starch being a natural material would vary somewhat from batch to batch, and that this variation probably accounted for the difference in the susceptibility of the starch to etherification under conditions otherwise the same.

By continuously metering the alkali or alkali-salt solution into a pump, pipeline, or in-line mixer through which the starch suspension is being passed, the individual starch granules are pretreated with the alkali catalyst. This pretreatment on a microscopic granule basis apparently results in much more uniform granule activation than heretofore achieved. This may account for the improved control of the etherification reaction with its consequent advantages of improved filterability, and reduced soluble loss. However, the invention is so surprising and unobvious in nature that further studies are needed to elucidate the theoretical explanation. To a much greater extent than was heretofore appreciated, it appears that the alkali on first contact with the starch slurry irreversibly conditions the individual granules. This previously unrecognized irreversible change results in activation of the granules for etherification. Contact with a high proportion of alkali apparently results in a permanent high degree of activation, even though the alkali is subsequently redistributed to other granules. Consequently, in the prior art method of operation, the amount of activation of individual granules for etherification, probably varied over a considerable range, although the overall alkali distribution in the suspension was analytically the same. In other words, the absorption of alkali by the starch granules in prior practice was not irreversible, the alkali tending toward an overall equilibrium distribution, but this such equilibrium distribution has now been found to be an insufficient criterion for uniformity of reaction by the individual granules.

As already indicated, the controlled method of the present invention results in a considerably reduced soluble loss with consequent savings for sewerage disposal, and, even more importantly, in a substantially increased yield of saleable products. Another important advantage is that the filtration and drying rates are improved, thereby requiring less time to carry out the filtration, washing, and drying steps of the process. Other surprising advantages have also been found. For example, products produced in accordance with this invention tend to have an improved color (whiteness) a less gritty nature, and improved redispersibility. Still another advantage is that the permissible rate of addition of the alkali or alkali-salt solution can be greatly increased without the formation of the undesirable "fisheyes." This also shortens the overall process time, resulting in a greatly increased production efficiency.

While the method of this invention is not necessarily limited to a metering of the alkali or alkali-salt solution into the total batch to be reacted, this is the ideal procedure. Because the proportion of alkali added to the starch suspension is no greater than the final ratio desired, the individual starch granules do not come into contact with an excess of alkali as during conventional alkali additions. This avoids localized swelling and gelatinization effects and gives very uniform alkali distribution. Another advantage of "in-line" addition of alkali is that part of the starch is not re-exposed or re-contacted with fresh alkali solution as in conventional alkali additions, but contacts only that proportion which is desired in the final mix. Furthermore, the resulting alkaline starch is susceptible to much more uniform derivatization or conversion during the subsequent etherification reaction.

The drawings:

The accompanying drawings illustrate embodiments of the present invention, wherein:

FIG. 1 is a diagrammatic flow sheet illustrating how the improved alkali addition method can be incorporated in a plant processing operation;

FIG. 2 is a partial flow sheet illustrating a modification of the alkali addition method;

FIG. 3 is a schematic view illustrating how an in-line jet type mixer can be employed for the alkali addition; and FIG. 4 is a schematic view illustrating how an in-line motor-driven mixer can be employed for the alkali addition.

DETAILED DESCRIPTION

In a preferred embodiment, the present process involves the addition of alkali solution or mixtures of alkali and swelling inhibitors to starch suspension as it is transferred to the treating tank where alkalinity is required. It is necessary to provide a zone of efficient agitation or high turbulence including and/or immediately following the point of addition of the alkali. This can be accomplished by injecting the alkali solution into a pump or similar device through which the starch suspension is passing during transfer to the treating tank. The alkali solution is metered in at a rate sufficient to give the ratio of active alkali to starch solids which is desired in the treating tank.

Any device which can be adapted to produce high turbulence in a moving stream of starch suspension is suitable for the "in-line" alkali addition. For optimum results, the two streams immediately following initial contacting should be subjected to a degree of agitation and turbulence sufficient to substantially instantaneously produce a uniform mixture. Various types of pumps, such as centrifugal pumps, gear pumps, impeller pumps, etc., can be fitted with an inlet for the addition of alkali solution to achieve the desired proportionate instantaneous mixing. In-line mixers, such as static baffle mixers, motor-driven mixers, and jet-type mixers can also be used.

The starch suspension into which the alkali solution is injected may be at any solids concentration provided that it is fairly mobile or fluid and capable of being agitated to a highly turbulent state. Thus, normal, ungelatinized starches can be treated at concentrations up to around 45% (dry starch solids by weight) depending upon the variety of starch and the temperature of the suspension. Concentrations up to 42.5% are advantageous. Usually, the concentration will be at least 25%. All varieties of starch, including corn, milo, potato, waxymaize, wheat, rice, tapioca, etc., can be treated successfully. Modified or derivatized starches which are still in the cold-water-insoluble, unswollen granule form are also susceptible to uniform alkali addition by the present process; for example, where the starch has been reacted with an increment of an alkyl halide, which used up the initial alkali, and the addition of further alkali is required for continuing the etherification reaction. The process has particular value for etherification of granule starch which is subsequently thinned by acids or oxidizing agents.

While any type of alkali may be added uniformly to starch suspensions by the present process, the greatest benefit is derived when alkali which has a strong starch-swelling tendency is added. Therefore, the method is especially suitable for the addition of alkali metal hydroxides, particularly sodium and potassium hydroxide. Other alkalis, such as calcium or barium hydroxide or quaternary alkyl ammonium hydroxides are also capable of swelling starch during conventional addition procedures and their uniformity of addition to starch is greatly improved by the present process.

The alkalinity range can be quite broad. Etherifications using epoxy reagents or unsaturated etherifying agents do not consume alkali and alkalinities of 0.5–2.0 part NaOH or equivalent alkali per 100 parts of starch solids are preferred. When alkyl halides are used, the proportion of alkali used will depend on the amount of alkyl halide reacted. Proportions of NaOH up to 5 parts per 100 parts of starch solids are feasible. The broad alkalinity range should probably be 0.3–5.0 parts of NaOH per 100 parts of starch solids or molar equivalent amounts of other alkali, such as KOH.

The control method of the present invention achieves its greatest benefits for the alkali-catalyzed reaction of starch with monofunctional etherifying reagents which require a relatively high alkalinity for efficient reaction. The term "monofunctional" as used herein means that the etherifying reagent reacts monofunctionally with the starch. Such reagents include:

(I) Alkylene oxides

Ethylene oxide
Propylene oxide
Butylene oxide
Styrene oxide
Epoxypropyl trimethyl ammonium chloride (II) Alkyl halides Methyl chloride
Benzyl chloride
Allyl chloride
Methallyl chloride
Sodium monochloracetate
Chloro butenyl trimethyl ammonium chloride (III) Unsaturated etherifying agents Acrylonitrile
Acrylamide The metered addition of the alkali or alkali-salt solution can be carried out at any temperature at which the slurry can be pumped up to the desired reaction temperature. Etherification reactions are usually conducted at a temperature below 130° F., and more commonly below 125° F. Consequently, the slurry to which the alkali or alkali-salt solution is added can conveniently be at a temperature of from 60 to 120° F. It will be understood, however, that the temperature is not particularly critical, providing gelatinization or swelling to a non-filterable state is avoided.

The salt swelling inhibitors usable in the method of the present invention are the same as those previously used in the prior art process for etherification of starch with alkaline oxides, alkyl halides, and other etherifying reagents requiring high levels of alkalinity. The most commonly used swelling inhibitors are sodium chloride and sodium sulfate, but other alkali or alkaline earth metal salts can be used. These include, for example, alkali metal salts (sodium, potassium or lithium), the specific salts disclosed in Hjermstad and Kesler Pat. 2,773,057, such as the alkali metal chlorides, carbonates, acetates, nitrates and sulfates. Preferably, a water solution of the alkali and the inhibitor salt is formed and continuously metered into the turbulently flowing stream of the starch slurry in the uniformly proportioned amount, the proportion being such as to achieve a predetermined alkali-to-starch solids concentration for the etherification reaction.

The theoretical understanding and practical application of the control method of the present invention will be more fully elucidated by the following comparative experiment:

COMPARATIVE EXPERIMENT

An unmodified corn starch suspension (40% solids) was used. A control batch was made up by adding a mixture of 30% caustic soda and 26% sodium chloride containing 1.5% NaOH based on dry starch solids and 4% NaCl based on initial water in the suspension. The salt-caustic mixture was added slowly to the vortex created by a high-speed propeller stirrer. Ethylene oxide (2.6% based on starch solids) was then added and the suspension agitated in a closed flask for 24 hours at 110° F. The suspension was neutralized to pH 5.0 with 50% $H_2SO_4$ and divided into 2 equal parts. One part was dewatered and washed four times and dried at room temperature. The other part was acid-converted by adding 50% $H_2SO_4$ solution containing 1% $H_2SO_4$ on total water and agitating for 24 hours at 120° F. The acid-converted portion was neutralized with 20% $Na_2CO_3$ solution, dewatered and washed four times and dried at room temperature.

Runs as closely identical to the above control run as possible were made but varying the proportion of starch suspension present during addition of the salt-caustic mixture. In these runs, ¼, ⅓ and ⅙ of the initial starch suspension used in the control run were present during addition of salt-caustic mixture. The suspensions were held at this alkalinity for one hour at room temperature and then the other ¾, ⅔ and ⅚, respectively of initial starch suspension were added. The runs were then made as described above for the control runs. The reaction conditions, characterization data, and analytical data are given below in Table A.

Certain points should be emphasized with respect to the data of Table A. Runs 1 and 5, 2 and 6, 3 and 7, and 4 and 8 were made up of four single batches which were subsequently divided into 2 parts, one part acid-converted and the other not. This is significant as showing that runs 7 and 8 were not merely swollen or partially gelatinized more than the other runs, and excludes an increase in the soluble portion for this reason. It may also be noted that great differences in solubles were obtained on acid-conversion even though the data indicates that the hydroxytion by violently agitating with a propeller and adding alkali without causing localized swelling or uneven granule activation. In the plant, however, we are dealing with batches ranging from 10,000 to 20,000 gallons in tanks which are usually 15 to 20 feet high and 10–14 feet in diameter. The starch suspension in such tanks, when full, will weigh 100,000 to 200,000 lbs. While agitation is provided to keep the starch from settling and to provide transfer of heat and chemicals, it is obvious that violent agitation to provide instantaneous transfer of added reagents to all parts of the suspension is impractical, if not impossible. When alkali solutions are added directly to such volumes of starch suspensions, as in the old process, the time for dilution and distribution will be several minutes at best. While violent agitation at the point of addition of the alkali, as in the old process, prevents the formation of gelatinized starch or "fisheyes" it does not prevent part of the starch from being exposed to proportions of alkali many times greater than the final proportion attained after distribution. It is, therefore, evident that in the old process, uniform activation of the starch for etherification is extremely difficult, if not impossible, to attain. The method of this invention, therefore, gives a solution to a problem which was not solved by prior processes.

TABLE A.—EFFECT OF VARIABLE SALT-CAUSTIC ADDITION[1]

| Run No. | Starch present during caustic addition | Acid conversion | Alkali fluidity (10 g.) | Percent solubles loss on starch | H.E.[2] sub., percent | Concentration d.s., percent | C.I. viscosity, Corn Industries Viscometer bath temperature 210° F., suspensions at pH 6.5 | | | | Viscosity[5] Brookfield, 20 r.p.m. | | | Aged pastes |
|---|---|---|---|---|---|---|---|---|---|---|---|---|---|---|
| | | | | | | | ° F.[3], T.I.V. | Peak, g. cm. | 30′, g. cm. | 24 hr.[4] gel, g. cm. | 190° F. cp. | 150° F., cp. | 120° F., cp. | |
| 1 | All | No | 0 | 0.89 | | 5.4 | 156 | 304 | 150 | 26 | 1,870 | 4,100 | 7,500 | Very translucent cohesive, fluid. |
| 2 | ¼ | No | 0 | 0.64 | | 5.4 | 161 | 320 | 155 | 29 | 1,760 | 3,750 | 6,800 | Do. |
| 3 | ⅓ | No | 0 | 1.53 | | 5.4 | 155 | 308 | 160 | 28 | 1,720 | 3,250 | 7,600 | Do. |
| 4 | ⅙ | No | 0 | 1.36 | | 5.4 | 155 | 274 | 128 | 30 | 1,510 | 2,480 | 6,000 | Do. |
| 5 | All | Yes | 58 | 3.95 | 1.69 | 22.5 | 138 | 1,980 | 10 | 70 | 132 | 540 | 1,700 | Translucent slight gel. |
| 6 | ¼ | Yes | 59 | 3.44 | 1.64 | 22.5 | 136 | 1,850 | 10 | 106 | 95 | 680 | 2,200 | Do. |
| 7 | ⅓ | Yes | 58 | 7.30 | 1.57 | 22.5 | 138 | 1,827 | 7 | 112 | 92 | 670 | 2,400 | Gels more on ageing. |
| 8 | ⅙ | Yes | 59 | 10.0 | 1.35 | 22.5 | 138 | 1,827 | 5 | 115 | 95 | 570 | 1,760 | Do. |

[1] Methods in Carbohydrate Chemistry, vol. IV by Whistler, Academic Press, N.Y., 1964, pp. 117–120.
[2] Analytical Chemistry, vol. 28, p. 892 (1956).
[3] Temperature at initial viscosity response.
[4] Methods in Carbohydrate Chemistry, vol. IV by Whistler, Academic Press, N.Y. 1964, pp. 148–150.
[5] Methods in Carbohydrate Chemistry, vol. IV by Whistler, Academic Press, N.Y. 1964, pp. 121–123.

ethylated starches which were acid-converted gave similar solubles losses before conversion. This is evidence supporting the view that the phenomenon involved is one of uniform activation of the starch granules, and not merely avoiding localized gelatinization or incipient swelling.

The data in Table A demonstrates that there is a very definite correlation between uniformity of granule activation by the caustic-salt mixture addition and the solubles loss, the hydroxyethyl contents of acid-converted starches, and the gel-strengths. With decreasing proportions of starch present during salt-caustic addition, increasing soluble losses, increasing gel-strengths, and decreasing hydroxyethyl contents were obtained. This indicates that the starch which is first contacted by excess causic is activated to a higher degree than the fresh starch which was subsequently added. It appears that this causes alkylation and, during acid conversion, solubilization of hydroxyethyl-rich portions of the starch or possible complete solubilization of hydroxyethyl-rich granules, thus lowering the average hydroxyethyl substitution. From this data it also appears that considerable monetary saving can be achieved if losses due to solubilization of starch and losses of ethylene oxide are minimized by uniform caustic activation of the starch granules.

In interpreting the data of Table A and extrapolating it to plant operation procedures, it should be kept in mind that the control batches where the alkali was initially added to all of the starch cannot be taken as representative of full-scale plant batches made by the conventional process. When a small amount of starch suspension is used, it is a simple matter to get instantaneous distribu- The method of this invention is illustrated by the following specific examples.

EXAMPLE I

Unmodified corn starch suspension at 22.6° Baumé and 76° F. was passed through a centrifugal pump at the rate of 1 gallon per minute. A mixture of 30% sodium hydroxide and 26% sodium chloride, 1.6 Normal with respect to NaOH, was injected into the starch stream under pressure at a point in the pump housing just below the starch inlet and at a rate adjusted to add 1.5 parts of dry basis NaOH per 100 parts of starch solids. The alkaline suspension was then treated according to the normal production process of preparing hydroxyethyl starch and acid-converting with sulfuric acid until the product gave a Brookfield viscosity at 20 r.p.m. of 60–80 centipoises in a 25% commercial solids concentration at 190° F. after cooking with agitation at 210° F. for 30 minutes. During the treatment 4.83% of the starch was solubilized and lost on filtering and washing. Eleven similar runs were made according to this procedure and the solubles losses ranged from 4.37% to 5.49%. This indicated a considerable reduction in solubles losses as compared with those experienced in a normal plant production where solubles losses for this grade of hydroxyethyl starch averaged 9.4% for several hundred batches produced over a two-year period.

In addition to the benefit of saving of time for alkali addition and reduction in solubles lost, the product made from starches treated "in-line" with alkali were generally whiter, less gritty, and their pastes clearer and whiter.

EXAMPLE II

A larger scale batch of hydroxyethyl starch similar to that prepared in Example II was made using the same equipment modified slightly to accommodate the larger scale. In this run modified corn starch suspension at 22° Baumé and 79° F. was pumped through the "in-line" mixer (e.g. centrifugal pump) at a rate of 10 gallons per minute. A mixture of 30% sodium hydroxide and 26% sodium chloride which was 1.6 Normal with respect to NaOH was injected into the pump housing at a rate sufficient to continuously add 1.5 parts of dry basis NaOH per 100 parts of starch solids. The alkaline starch suspension was hydroxyethylated and acid converted as in Example I.

The starch lost by solubilization was 6.2%. The product was whiter than normal production hydroxyethyl starch and filtered and dewatered faster.

EXAMPLE III

Unmodified corn starch suspension at 21.8° Baumé and 78° F. was pumped from storage tank through the centrifugal mixing pump where NaOH-NaCl mixture from a reagent supply tank, pumped through a positive displacement pump was injected into the starch suspension through the pump housing. At the point of contact both streams were rapidly and thoroughly mixed and passed on to the treating tank.

The NaOH-NaCl mixture was prepared by mixing 30% NaOH with 26% NaCl to 1.6 Normal with respect to NaOH. A total of 9,375 gallons of starch suspension containing 36,187 lbs. of starch solids was passed through the mixing pump and 1,137.5 gallons of NaOH-NaCl solution injected continuously at the rate of 16 gallons per minute into the pump which was transferring starch suspension at the rate of 132 gallons per minute.

The alkaline supension in the treating tank was treated according to the normal production process of preparing hydroxyethyl starch and acid converting with HCl until the product gave a Brookfield viscosity at 20 r.p.m. of 25–45 centipoises at 190° F. in a 25% commercial concentration after cooking with agitation at 210° F. for 30 minutes. During the treatment 6.07% of the starch was solublized and lost on filtering and washing. Three additional runs were made according to this procedure and soluble losses of 7.34%, 6.24% and 6.95% were obtained. This indicated a considerable reduction in soluble losses as compared with that experienced in conventional plant production where soluble losses fo rthis grade of hydroxyethyl starch averaged 12.9% during 1966 and 1967.

Discussion of drawings

FIG. 1 of the attached drawing shows a flow sheet illustrating the type of equipment used in Example IV. This set-up is suitable for plant-size operations. The granule starch slurry is introduced into a holding tank 10, which may be equipped with an agitator. Through a valve controlled outlet line the slurry is withdrawn through pipeline 11 to the intake side of a mixing pump 18, which may be a centrifugal pump. The flow of starch through the pump 18 and into line 12 will be turbulent, that is, non-laminar. The alkali-salt solution is transferred through a valve-controlled line 13 from a storage tank 14 by means of an injection pump 15, such as the positive displacement pump. The line 13 can be equipped with a flow indicator 16, such as a Rotameter, and passed through a valve-controlled pipeline 17 to a peripheral inlet in the pump housing 19, as indicated. The alkali-salt solution is thus injected into the pump housing under pressure for immediate substantially instantaneous admixture with the portion of the starch slurry passing through the pump 18 in turbulent flow. The intimate immediately formed mixture of the slurry and alkali-salt solution is then transferred through pipeline 12 to the reaction vessel 20, which may be equipped with an agitator as indicated. The monofunctional etherifying agent will be introduced into the tank 20, for example, into the lower portion thereof as the etherification reaction proceeds. On completion of the reaction, the etherified product will be withdrawn through a valve control pipeline 21 to be further processed by neutralization, filtration, washing and drying, as in present conventional plant processes.

In FIG. 2, a modified plant layout is shown. In this embodiment, the valve-controlled line 100 is connected directly to the supply pipeline from the starch plant and no holding tank is used. As with the embodiment of FIG. 1, the alkali solution or alkali-salt solution is stored in a tank 105. The solution can be continuously removed through a valve-controlled line 106 by pump 107 and passed through a pipeline 108, which may be equipped with a flow meter 109, and introduced at the intake of pump 103 in metered, proportioned flow together with the starch suspension from line 100. Inside the pump 107, the turbulent flowing stream of the starch suspension mixes thoroughly, instantaneously, and uniformly with the alkali or alkali-salt solution. The resulting activated starch granules are passed to a reaction vessel through pipeline 111.

In FIGS. 3 and 4, alternate in-line mixing devices are shown. FIG. 3 illustrates a jet-type mixer, while FIG. 4 illustrates a mechanical-type mixer. As shown in FIG. 3, the starch slurry is pumped through a pipeline 200 having a restricted section providing a Venturi 201. The alkali solution (or alkali-salt solution) is pumped to an ejector nozzle 202, which discharges the solution into the slurry immediately upstream of the Venturi 201. As the slurry and solution pass through the Venturi high agitation and turbulence is produced. The alkali and starch granules are thereby substantially instantaneously mixed. The activated starch granules can then be passed to a reaction vessel.

As shown in FIG. 4, the starch slurry can be supplied to the in-line mixer 300 through pipeline 301. The alkali solution (or alkali-salt solution) is supplied through an opposed inlet 302 under pump pressure, and merges with the incoming stream of starch slurry. The solution and slurry then pass through the mixer housing to the outlet 304, and are subjected to mechanical agitation by the paddle blades 305, which are mounted on a shaft 306 driven by motor 307. Here again substantially instantaneous mixing of the alkali with the starch granules is obtained, and the uniformly activated granules are discharged to the outlet 304. From the showing of these various modifications, it will be appreciated that the invention is of broad applicability, and is not dependent on a specific type of in-line mixing device.

By the method of this invention as described above, starch granules can be uniformly preactivated for reaction with an etherifying reagent. It will be apparent that this new technical information can be applied in various ways to achieve some or all of the advantages of the present invention. The marked advantages of this invention cannot be fully accounted for on the basis of any prior art knowledge. In fact, before the present invention, it was not recognized that a non-uniform initial exposure of granule starch to alkali had a definite effect on the nature of the final product, even though the mixing was controlled so that the granules were not irreversibly swollen so as to form "fisheyes." It was recognized that starch-alkali-water mixtures rapidly equilibrate regardless of the alkali-addition procedure. It was therefore assumed according to established principles of chemical engineering that equilibrium distribution of alkali would produce a uniform reaction and a reproducible product.

We claim:
1. The method of manufacturing plant batches of starch ethers in a large reaction tank wherein a water suspension of alkali-catalyzed granule starch is reacted with a monofunctional etherifying reagent while maintaining the filterability of the starch, wherein the improvement comprises: pumping a water suspension of granule starch through a pipeline including means in the line of stream flow therethrough producing turbulent flow of said suspension at a cross-section of said stream, continuously injecting into the turbulently flowing stream of said suspension at said cross-section substantially uniformly proportioned amounts of a water solution of an alkali etherification catalyst, thereby substantially instantaneously forming a uniform mixture of said alkali catalyst with said stream, and passing the resulting water suspension of alkali-catalyzed starch granules to said tank for carrying out said etherification reaction therein.

2. The method of claim 1 in which said catalyst is an alkali metal hydroxide and said etherifying reagent is an alkylene oxide.

3. The method of claim 1 in which said catalyst is sodium hydroxide and said etherifying reagent is ethylene oxide.

4. The method of claim 1 in which said water solution of said alkali etherification catalyst also contains an alkali metal salt swelling inhibitor for granule starch.

5. The method of manufacturing plant batches of thinned starch ethers in a large reaction tank wherein a water suspension of alkali-catalyzed granule starch is reacted with a monofunctional etherifying reagent while maintaining the filterability of the starch, and the granule starch is also thinned by treatment with an acid or oxidizing thinning agent, wherein the improvement comprises: introducing into said reaction tank a batch of alkali-catalyzed granule starch in water suspension preparatory to said reaction by pumping a stream of a water suspension granule starch through a pipeline discharging into said tank, said pipeline including means in the line of stream flow therethrough producing turbulent flow of said suspension at a cross-section thereof, and continuously injecting into the turbulently flowing stream of said suspension at said cross-section substantially uniformly proportioned amounts of a water solution of an alkali etherification catalyst thereby substantially instantaneously producing a uniform mixture of said alkali catalyst with said stream.

6. The method of claim 5 in which said catalyst is sodium hydroxide and said etherifying reagent is ethylene oxide.

7. The method of claim 5 in which said water solution of said alkali etherification catalyst also contains an alkali metal salt swelling inhibitor for granule starch.

8. The method of manufacturing plant batches of starch ethers in a large reaction tank wherein a water suspension of alkali-catalyzed granule starch is reacted with a monofunctional etherifying reagent while maintaining the filterability of the starch, wherein the improvement comprises: introducing into said reaction tank a batch of al alkali-catalyzed water suspension of granule starch preparatory to said reaction by pumping a water suspension of granule starch through a pipeline supplying said suspension to said tank, said pipeline including means in the line of stream flow therethrough producing turbulent flow of said suspension at a cross-section of said stream, and continuously injecting into the turbulent flowing stream of said suspension at said cross-section substantially uniformly proportioned amounts of a water solution of an alkali etherification catalyst, thereby substantially instantaneously producing a uniform mixture of said alkali catalyst with said starch.

9. The method of claim 8 in which said catalyst is sodium hydroxide and said water solution thereof also contains an alkali metal salt swelling inhibitor for granule starch.

References Cited

UNITED STATES PATENTS

| | | | |
|---|---|---|---|
| 2,516,633 | 7/1950 | Kesler et al. | 260—233.3 |
| 2,773,057 | 12/1956 | Hjermstad et al. | 260—233.3 |
| 2,801,241 | 7/1957 | Hobbs | 260—233.3 |
| 2,970,140 | 1/1961 | Hullinger et al. | 260—233.3 |
| 3,014,901 | 12/1961 | Gill et al. | 260—233.3 |
| 3,033,853 | 5/1962 | Klug | 260—233.3 |
| 3,062,810 | 11/1962 | Hjermstad et al. | 260—233.3 |
| 3,208,998 | 9/1965 | Fisher et al. | 260—233.3 |
| 3,243,426 | 3/1966 | Caesar | 260—233.3 |
| 3,336,292 | 8/1967 | Kirby | 260—233.3 |
| 3,378,546 | 4/1968 | Tsuzuki | 260—233.3 |
| 3,462,283 | 8/1969 | Hjermstad et al. | 260—233.3 |

OTHER REFERENCES

Whistler, Methods in Carbohydrate Chemistry, vol IV, Academic Press, N.Y. 1964, pp. 304–306.

DONALD E. CZAJA, Primary Examiner

M. I. MARQUIS, Assistant Examiner

U.S. Cl. X.R.

260—233.3 A, 233.5 R